United States Patent
Shang et al.

(10) Patent No.: US 11,054,302 B2
(45) Date of Patent: Jul. 6, 2021

(54) EVENT POSITIONING METHOD, DEVICE AND APPLICATION IN DISTRIBUTED FIBER VIBRATION MONITORING SYSTEM

(71) Applicant: Laser Institute of Shandong Academy of Science, Jining (CN)

(72) Inventors: Ying Shang, Ji'nan (CN); Chen Wang, Ji'nan (CN); Chang Wang, Ji'nan (CN); Jiasheng Ni, Ji'nan (CN); Chang Li, Ji'nan (CN); Wenan Zhao, Ji'nan (CN); Bing Cao, Ji'nan (CN); Sheng Huang, Ji'nan (CN); Xiaohui Liu, Ji'nan (CN); Yingying Wang, Ji'nan (CN)

(73) Assignee: Laser Institute of Shandong Academy of Science, Jining (CN)

( * ) Notice: Subject to any disclaimer, the term of this patent is extended or adjusted under 35 U.S.C. 154(b) by 87 days.

(21) Appl. No.: 16/443,397

(22) Filed: Jun. 17, 2019

(65) Prior Publication Data
US 2020/0355547 A1 Nov. 12, 2020

(30) Foreign Application Priority Data
May 10, 2019 (CN) .......................... 201910389122.7

(51) Int. Cl.
*G01H 9/00* (2006.01)
(52) U.S. Cl.
CPC .................................. *G01H 9/004* (2013.01)
(58) Field of Classification Search
CPC ............... G01H 9/004; G01D 5/35364; G01D 5/35358; G01D 1/35316
See application file for complete search history.

(56) References Cited

U.S. PATENT DOCUMENTS

| 4,743,113 A | 5/1988 | Jubinski |
| 6,545,760 B1* | 4/2003 | Froggatt ................ G01K 11/32 356/35.5 |

(Continued)

FOREIGN PATENT DOCUMENTS

| CN | 1414283 A | 4/2003 |
| CN | 201083536 Y | 7/2008 |

(Continued)

OTHER PUBLICATIONS

First Australian Office Action regarding Application No. 2019204200 dated Feb. 4, 2020.

(Continued)

*Primary Examiner* — Helen C Kwok
(74) *Attorney, Agent, or Firm* — Harness, Dickey & Pierce, P.L.C.

(57) ABSTRACT

The present invention provides an event positioning method, device and application in a distributed fiber vibration monitoring system. When a location at which an event occurs in a sensing fiber is to be positioned, an interference field signal having a maximum optical power is obtained by comparing optical powers of respective interference field signals corresponding to backward Rayleigh scattering lights that are generated when a pulse light is transmitted in the sensing fiber. Subsequently, a sensing location of the interference field signal having the maximum optical power is calculated. Finally, the location at which the event occurs in the sensing fiber is determined, according to the sensing location and a location distribution pattern of the event. According to the positioning method provided in the present invention, by screening the interference field signals and then calculating the event location, the spatial resolution is not determined merely by the pulse width of the optical signal. Therefore, (Continued)

the location positioning of the event can be more accurate, thereby improving an accuracy of the spatial resolution.

7 Claims, 4 Drawing Sheets

(56) References Cited

U.S. PATENT DOCUMENTS

| | | | | |
|---|---|---|---|---|
| 9,002,149 | B2* | 4/2015 | Rogers | G01D 5/35358 385/12 |
| 2013/0028289 | A1* | 1/2013 | Zhang | G01K 11/32 374/161 |
| 2014/0218717 | A1* | 8/2014 | Zhang | G01D 5/35364 356/32 |
| 2018/0143067 | A1* | 5/2018 | Wang | G01H 9/004 |
| 2019/0045543 | A1* | 2/2019 | Valls | H04W 74/0808 |
| 2020/0021365 | A1* | 1/2020 | Liu | H04B 10/548 |
| 2020/0249076 | A1* | 8/2020 | Ip | G01H 9/004 |

FOREIGN PATENT DOCUMENTS

| | | |
|---|---|---|
| CN | 102628698 A | 8/2012 |
| CN | 105157874 A | 12/2015 |

OTHER PUBLICATIONS

Ying, Shang et al., "Distributed Vibration Sensing of Perimeter Security Based on Space Difference of Rayleigh Backscattering," Infrared and Laser Engineering, vol. 47, No. 5; May 2018, pp. 1-6.

* cited by examiner

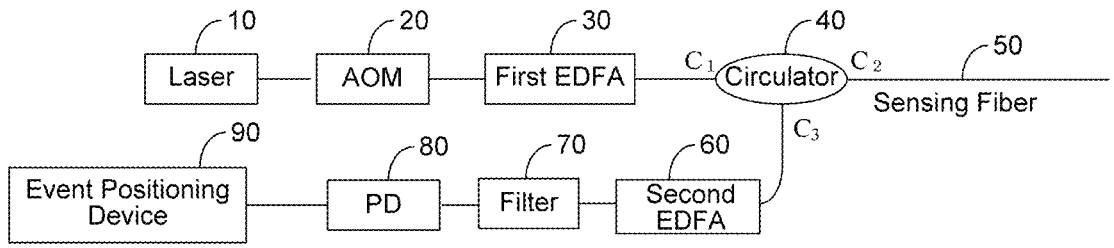

Fig. 1

```
┌─────────────────────────────────────────────────────┐
│ Obtaining respective interference field signals      │ S110
│ corresponding to backward Rayleigh scattering lights │
│ that are generated when a pulse light is transmitted │
│ in a sensing fiber in the distributed fiber vibration│
│ monitoring system                                    │
└─────────────────────────────────────────────────────┘
                         ▼
┌─────────────────────────────────────────────────────┐
│ Comparing optical powers of the respective           │ S120
│ interference field signals to obtain an interference │
│ field signal having a maximum optical power          │
└─────────────────────────────────────────────────────┘
                         ▼
┌─────────────────────────────────────────────────────┐
│ Calculating a sensing location at which the          │ S130
│ interference field signal having the maximum optical │
│ power is generated, according to a time when the     │
│ interference field signal having the maximum optical │
│ power is received and a time when the pulse light is │
│ injected into the sensing fiber                      │
└─────────────────────────────────────────────────────┘
                         ▼
┌─────────────────────────────────────────────────────┐
│ Determining, according to the sensing location, a    │ S140
│ location at which an event occurs in the sensing     │
│ fiber                                                │
└─────────────────────────────────────────────────────┘
```

Fig. 2

Pulse  $t_i$  $t_{i+1}$  $t_{i+2}$  $t_{i+3}$  $t_{i+4}$  $t_{i+5}$

Point Number  $i$   $i+1$  $i+2$  $i+3$  $i+4$  $i+5$  $i+6$  $i+7$  $i+8$  $i+9$  $i+10$  ......

Phase Variation  0  0  0  0  0  $\Delta\Phi$  $\Delta\Phi$  $\Delta\Phi$  $\Delta\Phi$  $\Delta\Phi$  $\Delta\Phi$ Time  $t_i$  $t_{i+1}$  $t_{i+2}$  $t_{i+3}$  $t_{i+4}$  $t_{i+5}$  $t_{i+6}$  $t_{i+7}$  $t_{i+8}$  $t_{i+9}$  $t_{i+10}$ Detected Light Intensity  $10\Delta\Phi$  $16\Delta\Phi$  $18\Delta\Phi$  $16\Delta\Phi$  $10\Delta\Phi$  0

Fig. 6

Pulse  $t_i$  $t_{i+1}$  $t_{i+2}$  $t_{i+3}$  $t_{i+4}$

Point Number  $i$  $i+1$  $i+2$  $i+3$  $i+4$  $i+5$  $i+6$  $i+7$  $i+8$  $i+9$  $i+10$  ......

Phase Variation  0  0  0  0  $\Delta\Phi$  $\Delta\Phi$  $2\Delta\Phi$  $2\Delta\Phi$  $2\Delta\Phi$  $2\Delta\Phi$  $2\Delta\Phi$ $t_{i+4}$   $8\Delta\Phi$
$t_{i+5}$   $12\Delta\Phi$
$t_{i+6}$   $12\Delta\Phi + 4*2\Delta\Phi$
$t_{i+7}$   $12\Delta\Phi + 4*2\Delta\Phi$
$t_{i+8}$   $12\Delta\Phi$
$t_{i+9}$   $8\Delta\Phi$

Fig. 7

EVENT POSITIONING METHOD, DEVICE AND APPLICATION IN DISTRIBUTED FIBER VIBRATION MONITORING SYSTEM

CROSS-REFERENCE TO RELATED APPLICATIONS

The present invention claims priority to Chinese Application No. 201910389122.7, filed on May 10, 2019, which is incorporated herein by reference in its entirety.

TECHNICAL FIELD

The present invention relates to the fiber sensing technology, and in particular, to an event positioning method, device and application in a distributed fiber vibration monitoring system.

BACKGROUND

The distributed fiber sensing technology is a technology for measuring by applying longitudinal properties of a fiber, and is widely applied and paid attention to because of the features such as full-scale continuity, network intelligence, and capability of a long distance.

Based on differences in properties of signals within the fiber, the distributed fiber sensing technology may be divided into the distributed fiber sensing based on Rayleigh scattering, the distributed fiber sensing based on Raman scattering, and the distributed fiber sensing based on Brillouin scattering. Among such, the Rayleigh scattering belongs to elastic scattering, and is easier to be monitored because the Rayleigh scattering has a higher energy with respect to the Raman scattering and the Brillouin scattering. Therefore, at present, a distributed fiber vibration monitoring system based on the Rayleigh scattering is usually used to continuously measure external physical parameters distributed, on an length of the entire fiber, along a geometry path of the fiber.

An important index in the distributed fiber vibration monitoring system is a spatial resolution. The spatial resolution refers to a nearest distance between two events that can be distinguished when the two events simultaneously occur in the system, which determines whether a missing report rate of system events is high or not. The spatial resolution of the fiber distributed vibration monitoring system is mainly determined by a pulse width of a drive signal of an optical pulse modulator in the system. The optical pulse modulator mainly includes two types of modulator such as an acousto-optic modulator and an electro-optical modulator. Among such, the physical basis of the electro-optical modulator (EOM) is electro-optic effects, but the extinction of the EOM is relatively low. The physical basis of the acousto-optic modulator (AOM) is acousto-optic effects, and the AOM has a main advantage of relatively large extinction. In actual applications, because a distance to be monitored varies from several kilometers to hundreds of kilometers, in order to achieve highly sensitive monitoring over a long distance, the optical pulse modulator is required to have a high extinction ratio. Therefore, the AOM is usually used in the fiber distributed vibration monitoring system.

However, the time of a rising edge and a falling edge of the drive signal of the AOM is relatively long. Therefore, a pulse width is usually relatively large, and a value thereof usually is hundreds of nanoseconds. As a result, the spatial resolution of the fiber distributed vibration monitoring system is relatively low, and usually is within a range of dozens of meters. Therefore, a fiber distributed vibration monitoring system having a high spatial resolution is urgently required so as to satisfy the engineering requirements for a spatial resolution at a scale of meters.

SUMMARY

The present invention provides an event positioning method, device and application in a distributed fiber vibration monitoring system to resolve a problem that a spatial resolution of the existing distributed fiber vibration monitoring system is low.

According to a first aspect of an embodiment of the present invention, a distributed fiber vibration event positioning method is provided, which is applied to a distributed fiber vibration monitoring system based on Rayleigh scattering, where the method includes:

injecting a pulse light into a sensing fiber in the distributed fiber vibration monitoring system;

obtaining respective interference field signals corresponding to backward Rayleigh scattering lights that are generated when the pulse light is transmitted in the sensing fiber;

comparing optical powers of the respective interference field signals to obtain an interference field signal having a maximum optical power;

calculating a sensing location at which the interference field signal having the maximum optical power is generated, according to a time when the interference field signal having the maximum optical power is received and a time when the pulse light is injected into the sensing fiber; and determining, according to the sensing location, a location at which an event occurs in the sensing fiber.

Optionally, the determining, according to the sensing location, a location at which an event occurs in the sensing fiber includes:

calculating a spatial resolution of the distributed fiber vibration monitoring system according to a pulse width of the pulse light; and obtaining a parity of the spatial resolution, where, when the spatial resolution is an odd number, the location at which the event occurs in the sensing fiber is $L_{th} = L_{max} - (S-1)/2$;

when the spatial resolution is an even number, the location at which the event occurs in the sensing fiber is $L_{th} = L_{max} - (S/2+1)$; and where $L_{max}$ represents the sensing location, and S represents the spatial resolution.

Optionally, the determining, according to the sensing location, a location at which an event occurs in the sensing fiber includes:

calculating a spatial resolution of the distributed fiber vibration monitoring system according to a pulse width of the pulse light, where, when the spatial resolution is an odd number, the locations at which the events occur in the sensing fiber are $L_{th1} = L_{max} - (S-1)/2$ and $L_{th2} = L_{max} - (S+1)/2 + M - S + 1$ respectively;

when the spatial resolution is an even numbered, the locations at which the events occur in the sensing fiber are $L_{th1} = L_{max} - S/2)$ and $L_{th2} = L_{max} - S/2 + M - S + 1$, respectively; and where $L_{max}$ represents an effective sensing location, $L_{th1}$ represents a first location point at which the event occurs, $L_{th2}$ represents a second location point at which the event occurs, S represents the spatial resolution, and M represents a quantity of interference field signals having disturbance information.

Optionally, the determining, according to the sensing location, a location at which an event occurs in the sensing fiber includes:

calculating a spatial resolution of the distributed fiber vibration monitoring system according to a pulse width of the pulse light; and obtaining a parity of the spatial resolution, where, when the spatial resolution is an odd number, the location at which the event occurs in the sensing fiber is $L_{th}=P_{max}-(S-1)/2+N$;

when the spatial resolution is an even number, the location at which the event occurs in the sensing fiber is $L_{th}=P_{max}-S/2+1+N$; and where $L_{max}$ represents the sensing location, S represents the spatial resolution, N represents a propagation distance corresponding to the pulse width of the pulse light.

Optionally, the determining, according to the sensing location, a location at which an event occurs in the sensing fiber includes:

calculating a spatial resolution of the distributed fiber vibration monitoring system according to a pulse width of the pulse light, where, when the spatial resolution is an odd number, the locations at which the events occur in the sensing fiber are $L_{th1}=L_{max}-(S+1)/2+N$ and $L_{th2}=L_{max}-(S+1)/2+M-S+1+N$, respectively;

when the spatial resolution is even numbered, the locations at which the events occur in the sensing fiber are $L_{th1}=L_{max}-S/2+N$ and $L_{th2}=L_{max}-S/2+M-S+1+N$, respectively; and where $L_{max}$ represents an effective sensing location, $L_{th1}$ represents the first location point at which the event occurs, $L_{th2}$ represents the second location point at which the event occurs, S represents the spatial resolution, M represents the quantity of the interference field signals having the disturbance information, and N represents a propagation distance corresponding to the pulse width of the pulse light.

According to a second aspect of an embodiment of the present invention, a distributed fiber event positioning device is provided, which is applied to a distributed fiber vibration monitoring system based on Rayleigh scattering, where the device includes:

an interference field signal obtaining unit, configured to obtain respective interference field signals corresponding to backward Rayleigh scattering lights that are generated when a pulse light are transmitted in a sensing fiber in the distributed fiber vibration monitoring system;

an optical power comparison unit, configured to compare optical powers of the respective interference field signals to obtain an interference field signal having a maximum optical power;

a sensing location calculation unit, configured to calculate a sensing location at which the interference field signal having the maximum optical power is generated, according to a time when the interference field signal having the maximum optical power is received and a time when the pulse light is injected into the sensing fiber; and an event location determining unit, configured to determine, according to the sensing location, a location at which an event occurs in the sensing fiber.

According to a third aspect of an embodiment of the present invention, a distributed fiber vibration monitoring system is provided, where the system includes the event positioning device in the distributed fiber vibration monitoring system provided in the second aspect of the embodiment of the present invention, and further includes a laser, an acousto-optic modulator connected to the laser, a circulator connected to the acousto-optic modulator, a sensing fiber connected to the circulator, and a photodetector connected to the event positioning device in the distributed fiber vibration monitoring system and the circulator.

It may be seen from the foregoing embodiments that according to the event positioning method, device and application in a distributed fiber vibration monitoring system that are provided in the embodiments of the present invention, when the location at which the event occurs in the sensing fiber is to be positioned, the interference field signal having the maximum optical power is obtained by comparing the optical powers of the respective interference field signals corresponding to the backward Rayleigh scattering lights that are generated when the pulse light is transmitted in the sensing fiber. Subsequently, the sensing location of the interference field signal having the maximum optical power is calculated. Finally, the location at which the event occurs in the sensing fiber is determined, according to the sensing location and a location distribution pattern of the event. According to positioning method provided in the present invention, by means of screening the interference field signals and then calculating an event location, the spatial resolution is not determined merely by the pulse width of the optical signal. Therefore, the location positioning of the event can be more accurate, thereby improving an accuracy of the spatial resolution.

It should be understood that the foregoing general descriptions and detailed descriptions below are merely exemplary and explanatory, and are not intended to limit the present invention.

BRIEF DESCRIPTION OF THE DRAWINGS

To more clearly describe the technical solutions of the present invention, the accompanying drawings to be used in the embodiments are briefly illustrated below. Obviously, persons of ordinary skills in the art can also derive other accompanying drawings according to these accompanying drawings without an effective effort.

FIG. 1 is a basic schematic structural diagram of a distributed fiber vibration monitoring system according to an embodiment of the present invention.

FIG. 2 is a basic schematic flowchart of an event positioning method in a distributed fiber vibration monitoring system according to an embodiment of the present invention.

FIG. 6 is a diagram of phase demodulation results at different times when an event occurs within a range of a spatial resolution according to an embodiment of the present invention.

FIG. 7 is a diagram of phase demodulation results at different times when two events occur within a range of a spatial resolution and the spatial resolution is an even number according to an embodiment of the present invention.

DETAILED DESCRIPTION

Figure 3:
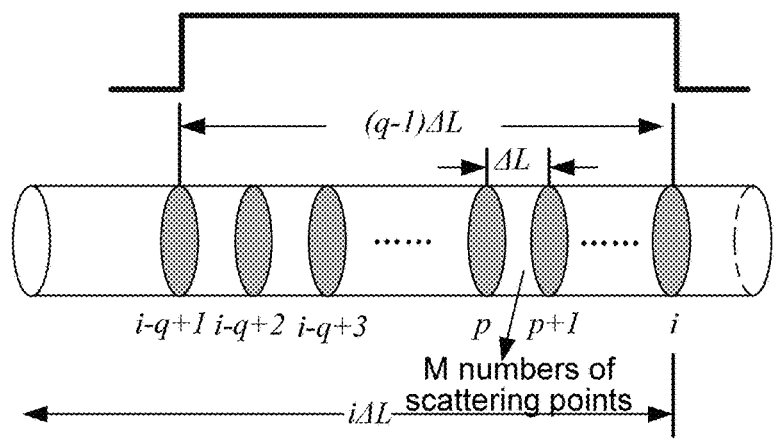
FIG. 3 is a schematic diagram of a discrete model of backward Rayleigh scattering according to an embodiment of the present invention.

Exemplary embodiments are described in detail, and examples thereof are shown in the accompanying drawings. When the descriptions below relate to the accompanying drawings, unless otherwise stated, same numerals in different accompanying drawings indicate same or similar elements. Implementations described in the following exemplary embodiments do not represent all implementations consistent with the present invention. On the contrary, these implementations are merely examples of a device and a method that are described in detail in the appended claims and that are consistent with some aspects of the present invention.

FIG. 1 is a basic schematic structural diagram of a distributed fiber vibration monitoring system according to the present embodiment. As shown in FIG. 1, the system mainly includes a laser 10, an acousto-optic modulator (AOM) 20 connected to the laser 10, and a circulator 40 connected to the AOM 20. In the present embodiment, in order to achieve power amplification of a pulse light, a first erbium doped fiber amplifier (EDFA) 30 is further provided between the AOM 20 and the circulator 40. The system further includes a sensing fiber 50 connected to an end $C_2$ of the circulator 40, and a photodetector (PD) 80 connected to an end $C_3$ of the circulator 40. In order to process an output signal of the circulator, a second EDFA 60 and a filer 70 are further provided between the end $C_3$ of the circulator 40 and the PD 80. Finally, the system further includes an event positioning device 90 according to the present embodiment. It should be noted that in the actual use, some components in the foregoing vibration monitoring system can be replaced, and some elements may be added or reduced.

By using the foregoing vibration monitoring system, the laser 10 transmits a continuous laser light with a narrow line width, which becomes an optical pulse sequence through the chopping of the AOM 20. The pulse light enters an end $C_1$ of the circulator 40 after being performed with power amplification by the first EDFA 30, and then is injected into the sensing fiber 50 through the end $C_2$ of the circulator 40. A backward Rayleigh scattering signal in the sensing fiber 50 enters into the second EDFA 60 through the end $C_3$ of the circulator 40. The Rayleigh scattering signal is amplified and then passes through the filter 70 to enter into the PD 80. An electrical signal that is obtained by photoelectric conversion via the PD 80 enters the event positioning device 90. The event positioning device 90 determines a location at which an event occurs in the sensing fiber 50 by analyzing the received electrical signal. Specifically, a data processing process of the event positioning device 90 is described in detail below.

FIG. 2 is a basic schematic flowchart of an event positioning method in a distributed fiber vibration monitoring system according to an embodiment of the present invention. As shown in FIG. 2, the method specifically includes the following steps:

S110: respective interference field signals corresponding to backward Rayleigh scattering lights that are generated when a pulse light is transmitted in a sensing fiber in the distributed fiber vibration monitoring system are obtained.

FIG. 3 is a schematic diagram of a discrete model of backward Rayleigh scattering according to an embodiment of the present invention. As shown in FIG. 3, in the present embodiment, when a laser light with a narrow line width that has a long coherence length is injected into the sensing fiber, scattering points in the sensing fiber may be seen as a series of discrete reflectors. The reflected signal of a certain reflector may be considered as a vector sum of the backward scattering lights of the randomly distributed scattering points within a range of a unit scattering length $\Delta L$.

The unit scattering length $\Delta L$, is defined as:

$$\Delta L = \frac{C}{2 S_a n_f} \qquad \text{Formula (1)}$$

In formula (1), $S_a$ represents a sampling rate of the vibration monitoring system, C represents a speed of light in vacuum, and $n_f$ represents a refractive index of the sensing fiber.

As shown in FIG. 3, assuming that there are M numbers of the randomly distributed Rayleigh scattering points within $\Delta L$, and they have the same polarization state, a light field at a $p^{th}$ reflector is a field vector sum of the M numbers of scattering points, which may be expressed as:

$$E_b(p) = r_p \exp(j\phi_p) = \sum_{m=1}^{M} a_m \exp(j\Omega_m) \qquad \text{Formula (2)}$$

In formula (2), $r_p$ represents an amplitude vector sum of light fields of M numbers of backward scattering points of a $p^{th}$ section of fiber, and is defined as a reflectivity of the $p^{th}$ reflector; $\phi_p$ represents a phase vector sum of the M numbers of backward scattering points, and is defined as a phase of the $p^{th}$ reflector; $a_m$ represents an amplitude value of a light field of an $m^{th}$ backward scattering point within the $\Delta L$ fiber length; and $\Omega_m$ represents a phase value of the light field of the $m^{th}$ backward scattering point.

Because a laser pulse having a pulse width of W is injected into the sensing fiber, the light only exists in one section of the fiber at different times. That is, only such a section of the fiber is "illuminated". Correspondingly, an illuminate length in the fiber that is observed by a detector is $(q-1)\Delta L$, where $$(q-1)\Delta L = \frac{WC}{2n_f} \qquad \text{Formula (3)}$$

In formula (3), q represents a quantity of the equivalent reflectors in the illuminated fiber.

On the basis of the foregoing assumption, an interference field of the backward Rayleigh scattering lights in a distance of $i\Delta L$ from an initial end is a field vector sum of an $(i-q+1)^{th}$ equivalent reflector to an $i^{th}$ equivalent reflector. An expression of a light intensity at $L_i$ is shown below:

$$E_b(L_i) = E_0 \sum_{k=i-q+1}^{i} P_k r_k e^{j\varphi_k} e^{-\alpha k \Delta L} \qquad \text{Formula (4)}$$

In formula (4), $P_k$ represents a polarization state of a light field of a $k^{th}$ equivalent reflector; $r_k$ represents an amplitude vector of the light field of the $k^{th}$ equivalent reflector; $\varphi_k$ represents a phase vector of the $k^{th}$ equivalent reflector; a represents an attenuation coefficient of the fiber; and $L_i$ represents a location of an $i^{th}$ unit scattering length, that is, $L_i = i\Delta L$.

It is known from FIG. 3 and formula (4) that an interference field of the backward Rayleigh scattering lights at $L_i$ is a field vector sum of the $(i-q+1)^{th}$ to the $i^{th}$ equivalent reflectors, that is, a field vector sum of q numbers of equivalent reflectors within a pulse width.

Figure 4:
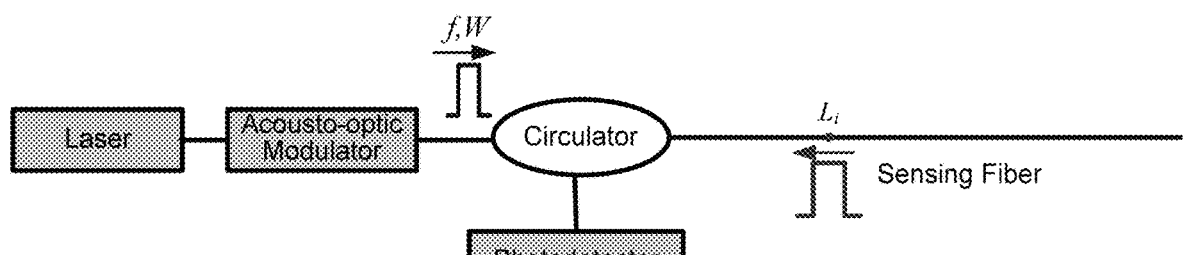
FIG. 4 is a schematic diagram of a vibration monitoring optical path of backward Rayleigh scattering according to an embodiment of the present invention.

FIG. 4 is a schematic diagram of a vibration monitoring optical path of backward Rayleigh scattering according to an embodiment of the present invention. As shown in FIG. 4, a high-coherence pulse light beam having an optical frequency of f and a pulse width of W is injected into the fiber from the circulator at a time of t=0. An expression of a light field obtained by the PD at a time of t is as follows:

$$E_b(t) = \sum_{k=1}^{N} a_k \cos[2\pi f(t-\tau_k)] rect\left(\frac{t-\tau_k}{W}\right) \quad \text{Formula (5)}$$

In formula (5), $a_k$ represents an amplitude of the light field. When $$0 \le \left[\frac{t-\tau_k}{W}\right] \le 1,$$

a rectangle function $$rect\left(\frac{t-\tau_k}{W}\right) = 1;$$

and in other cases, $rect[(t-\tau k)/W]=0$. $\tau_k$ represents a time delay of any $k^{th}$ equivalent reflector in the fiber, and a relationship between $\tau_k$ and $L_k$ is $\tau_k = 2n_f L_k/C = 2n_f k\Delta L/C$. N represents a total quantity of the equivalent reflectors.

Figure 5:
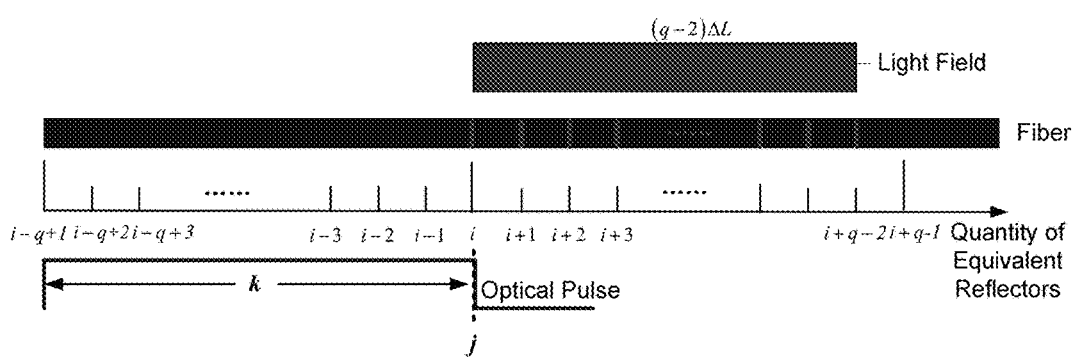
FIG. 5 is a schematic diagram of a discrete model of corresponding backward Rayleigh scattering when an event occurs at Li of a sensing fiber according to an embodiment of the present invention.

FIG. 5 is a schematic diagram of a discrete model of corresponding backward Rayleigh scattering when an event occurs at Li of a sensing fiber according to an embodiment of the present invention. As shown in FIG. 5, assuming that an event occurs, that is, disturbance information $\Delta\Phi$ is applied to, at the $i^{th}$ equivalent reflector (that is, Li of the sensing fiber), a disturbance signal applied to a certain equivalent reflector is referred to as a point disturbance signal. An observation time $t_j$ observed by the PD that a front edge of an optical pulse arrives at a $j^{th}$ equivalent reflector of the sensing fiber is:

$$t_j = \frac{2n_f L_j}{C} = \frac{2n_f j\Delta L}{C} \quad \text{Formula (6)}$$

By substituting formula (6) and formula (3) into formula (5), it may be known that an expression of a light field obtained by the PD at the time of $t_j$ is as follows:

$$E_b(t_j) = \sum_{k=1}^{N} a_k \cos\left[\frac{4\pi f n_f \Delta L(j-k)}{C}\right] rect\left(\frac{j-k}{q-1}\right) \quad \text{Formula (7)}$$

$$= \sum_{k=j-q+1}^{j} a_k \cos\left[\frac{4\pi f n_f \Delta L(j-k)}{C}\right]$$

In formula (7), $a_k$ represents a light field intensity of the $k^{th}$ equivalent reflector within a pulse range that is observed by the PD at the time of $t_j$.

When the front edge of the optical pulse arrives at the $i^{th}$ equivalent reflector of the sensing fiber, that is, when j=i, because an event occurs at Li of the sensing fiber, it may be known from formula (7) that an expression of the light field obtained by the PD at the time of $t_j$ is as follows:

$$E_b(t_i) = \sum_{k=i-q+1}^{i-1} a_k \cos\left[\frac{4\pi f n_f \Delta L(i-k)}{C}\right] + a_i \cos\Delta\Phi \quad \text{Formula (8)}$$

According to formula (8), the detected optical power value $I_b(t_j)$ is:

$$I_b(t_i) = \langle E_b(t_i) \times E_b^*(t_i) \rangle = \quad \text{Formula (9)}$$

$$2 \sum_{m=i-q+1}^{i-1} \sum_{n=i-q+1}^{i-1} a_m a_n \cos\left[\frac{4\pi f n_f \Delta L(m-n)}{C}\right] +$$

$$2a_i^2 + 2 \sum_{k=i-q+1}^{i-1} a_k a_i \cos\left[\frac{4\pi f n_f \Delta L(i-k)}{C} - \Delta\Phi\right]$$

According to formula (9), it may be known that at the time of $t_j$, the disturbance information $\Delta\Phi$ is observed at the $i^{th}$ equivalent reflector.

When the front edge of the optical pulse arrives at a $(i+1)^{th}$ equivalent reflector of the sensing fiber, that is, when j=i+1, it may be known that an expression of a light field obtained by the PD at a time of $t_{j+1}$ is as follows:

$$E_b(t_{i+1}) = \sum_{k=i-q+2}^{i-1} a_k \cos\left[\frac{4\pi f n_f \Delta L(i+1-k)}{C}\right] + \quad \text{Formula (10)}$$

$$a_i \cos\left[\frac{4\pi f n_f \Delta L}{C} + \Delta\Phi\right] + a_{i+1} \cos\Delta\Phi$$

Correspondingly, the detected optical power signal $I_b(t_{i+1})$ is:

$$I_b(t_{i+1}) = \langle E_b(t_{i+1}) \times E_b^*(t_{i+1}) \rangle = \quad \text{Formula (11)}$$

$$2 \sum_{m=i-q+2}^{i-1} \sum_{n=i-q+2}^{i-1} a_m a_n \cos\left[\frac{4\pi f n_f \Delta L(m-n)}{C}\right] +$$

$$2a_i a_{i+1} \cos\left(\frac{4\pi f n_f \Delta L}{C}\right) + 2(a_i^2 + a_{i+1}^2) +$$

$$2 \sum_{k=i-q+2}^{i-1} a_k a_{i+1} \cos\left[\frac{4\pi f n_f \Delta L(i+1-k)}{C} - \Delta\Phi\right] +$$

$$2\sum_{k=i-q+2}^{i-1} a_k a_i \cos\left[\frac{4\pi f n_f \Delta L(i-k)}{C} - \Delta\Phi\right]$$

According to formula (11), it may be known that at the time of $t_{j+1}$, the disturbance information $\Delta\Phi$ is observed at the $(i+1)^{th}$ equivalent reflector.

Similarly, when the front edge of the optical pulse arrives at a $(i+q-2)^{th}$ equivalent reflector of the sensing fiber, that is, when $j=i+q-2$, it may be known that an expression of a light field obtained by the PD at a time of $t_{j+q-2}$ is as follows:

$$E_b(t_{i+q-2}) = a_{i-1}\cos\left[\frac{4\pi f n_f \Delta L(q-1)}{C}\right] + \sum_{k=i}^{i+q-2} a_k \cos\left[\frac{4\pi f n_f \Delta L(i+q-2-k)}{C} + \Delta\Phi\right] \quad \text{Formula (12)}$$

Correspondingly, the detected optical power signal $I_b(t_{i+q-2})$ is:

$$I_b(t_{i+q-2}) = \langle E_b(t_{i+q-2}) \times E_b^*(t_{i+q-2})\rangle = \quad \text{Formula (13)}$$
$$2\sum_{m=i}^{j+q-2}\sum_{n=i}^{j+q-2} a_m a_n \cos\left[\frac{4\pi f n_f \Delta L(m-n)}{C}\right] +$$
$$2\sum_{k=i}^{i+q-2} a_k a_{i-1}\cos\left[\frac{4\pi f n_f \Delta L(i-1-k)}{C} + \Delta\Phi\right]$$

According to formula (13), it may be known that at the time of $t_{i+q-2}$, the disturbance information $\Delta\Phi$ is observed at the $(i+q-2)^{th}$ equivalent reflector.

When the front edge of the optical pulse continues to go ahead and arrives at a $(i+q-1)^{th}$ equivalent reflector of the sensing fiber, that is, when $j=i+q-1$, it may be known that an expression of a light field obtained by the PD at a time of $t_{j+q-1}$ is as follows:

$$E_b(t_{i+q-1}) = \sum_{k=i}^{i+q-1} a_k \cos\left[\frac{4\pi f n_f \Delta L(i+q-2-k)}{C} + \Delta\Phi\right] \quad \text{Formula (14)}$$

Correspondingly, the detected optical power signal $I_b(t_{i+q-1})$ is:

$$I_b(t_{i+q-1}) = \langle E_b(t_{i+q-1}) \times E_b^*(t_{i+q-1})\rangle = \quad \text{Formula (15)}$$
$$2\sum_{m=i}^{i+q-1}\sum_{n=i}^{i+q-1} a_m a_n \cos\left[\frac{4\pi f n_f \Delta L(m-n)}{C}\right]$$

According to formula (15), it may be known that at the time of $t_{i+q-1}$, no disturbance information $\Delta\Phi$ is observed at the $(i+q-1)^{th}$ equivalent reflector.

In view of the above, the disturbance information $\Delta\Phi$ is included in $\{I_b(t_i), I_b(t_{i+1}), \ldots, I_b(t_{i+q-2})\}$, but is not included in $\{I_b(t_{i+q-1}) \ldots \}$. That is, the point disturbance information $\Delta\Phi$ at the $i^{th}$ equivalent reflector is extended to a range of (q−2) numbers of equivalent reflectors subsequent to the $i^{th}$ equivalent reflector.

S120: optical powers of the respective interference field signals are compared to obtain an interference field signal having a maximum optical power.

On the basis of step S110, that the detector observes, at different times, the distribution pattern of the disturbance information at the respective equivalent reflectors, the one having the $\Delta\Phi$ can be marked as an effective interference field signal. Meanwhile, because quantities of cosine items including $\Delta\Phi$ in the optical power signals are different, the corresponding optical power values are also different. A larger quantity of the cosine items including $\Delta\Phi$ indicates a greater optical power.

Further, the interference field signal having the maximum optical power can be obtained by comparing optical powers of received interference field signals.

S130: a sensing location at which the interference field signal having the maximum optical power is generated is calculated, according to a time when the interference field signal having the maximum optical power is received and a time when the pulse light is injected into the sensing fiber.

It is assumed that the time when the interference field signal having the maximum optical power is received is $t_{max}$, and the time when the pulse light is injected into the sensing fiber is $t_o$. Correspondingly, the sensing location $L_{max}$ at which the interference field signal having the maximum optical power is generated is:

$$L_{max} = \frac{c(t_{max} - t_o)}{2n_f} \quad \text{Formula (16)}$$

S140: a location at which an event occurs in the sensing fiber is determined, according to the sensing location.

According to the distribution pattern in step S110 that when an event occurs at Li of the sensing fiber, the point disturbance information $\Delta\Phi$ at the $i^{th}$ equivalent reflector is extended to the range of (q−2) numbers of equivalent reflectors subsequent to the $i^{th}$ equivalent reflector, the location at which the event occurs in the sensing fiber can be determined according to the sensing location.

1) When an event occurs in a spatial resolution S, correspondingly, a correspondence relationship between the location at which the event occurs in the sensing fiber and the sensing location where the interference field signal has the maximum optical power is that:

a. When the spatial resolution S is an odd number, the location at which the event occurs in the sensing fiber is:

$$L_{th} = L_{max} - (S-1)/2 \quad \text{Formula (17)}$$

The spatial resolution $$S = \frac{P \times 10^{-9} \times C}{2 \times n_f},$$

and P represents the pulse width of the pulse light signal.

b. When the spatial resolution S is an even number, the location at which the event occurs in the sensing fiber is:

$$L_{th} = L_{max} - S/2 \quad \text{Formula (18)}$$

2) When two events occur in the spatial resolution S, correspondingly, a correspondence relationship between locations at which the events occur in the sensing fiber and the sensing location where the interference field signal has the maximum optical power is that:

a. When the spatial resolution is an odd number, the locations at which the events occur in the sensing fiber are respectively $$L_{th1}=L_{max}-(S+1)/2 \text{ and}$$

$$L_{th2}=L_{max}(S+1)/2+M-S+1 \quad \text{Formula (19)}$$

b. When the spatial resolution is an even number, the locations at which the events occur in the sensing fiber are respectively $$L_{th1}=L_{max}-S/2 \text{ and}$$

$$L_{th2}=L_{max}-S/2+M-S+1 \quad \text{Formula (20)}$$

In formula (20), $L_{th1}$ represents a first location point at which the event occurs, $L_{th2}$ represents a second location point at which the event occurs, S represents the spatial resolution, and M represents a quantity of interference field signal having the disturbance information.

It should be noted that the foregoing formulas (17) to (20) are derived according to a case that, when two or more interference field signals having maximum optical powers are obtained, a sensing location where the first interference field signal having a maximum optical power is used as an effective sensing location. For the other case that a sensing location where the other interference field signal having a maximum another power is used as the effective sensing location, modifications may be made to the foregoing formulas correspondingly.

Hereinafter, the foregoing theoretical derivations will be verified by taking a value of Sa being 100 Mbps, $C=3\times10^8$ m/s, $n_f=1.5$, and $\Delta L=1$ m as an example.

FIG. 6 is a diagram of phase demodulation results at different times when an event occurs within a range of a spatial resolution according to an embodiment of the present invention. As shown in FIG. 6, when the spatial resolution S=5 (in actual cases, a size of S is at a scale of dozens of meters), assuming that an event $\Delta\Phi$ occurs at a location (i+5) of a sensing fiber, an optical power signal $I_{i+5}$ of a $(i+5)^{th}$ Rayleigh scattering point that is detected at a time of $t=t_{i+5}$ is:

$$I_{i+5}=[E_i(t_{i+5})+E_{i+1}(t_{i+5})+E_{i+2}(t_{i+5})+E_{i+3}(t_{i+5})+$$
$$E_{i+4}(t_{i+5})+E_{i+5}(t_{i+5})]*\times[E_i(t_{i+5})+E_{i+1}(t_{i+5})+$$
$$E_{i+2}(t_{i+5})+E_{i+3}(t_{i+5})+E_{i+4}(t_{i+5})+E_{i+5}(t_{i+5})]$$

Correspondingly, $I_{i+5}$ includes 10 cosine items of $\Delta\Phi$.

Similarly, it is obtained that an expression of a light field obtained at a time of $t_{i+6}$ is:

$I_{i+6}$ includes 16 cosine items of $\Delta\Phi$.

By way of analogy, relationships as shown in FIG. 6 may be obtained.

At a time of $t_{i+7}$, $I_{i+7}$ includes 18 cosine items of $\Delta\Phi$.
At a time of $t_{i+8}$, $I_{i+8}$ includes 16 cosine items of $\Delta\Phi$.
At a time of $t_{i+9}$, $I_{i+9}$ includes 10 cosine items of $\Delta\Phi$.
At a time of $t_{i+10}$, $I_{i+10}$ does not include cosine items of $\Delta\Phi$.

Further, $L_{max}$ is at (i+7). According to formula (17), it may be calculated that a location at which the event occurs is at (i+5).

FIG. 7 is a diagram of phase demodulation results at different times when two events occur within a range of a spatial resolution and the spatial resolution is an even number according to an embodiment of the present invention. As shown in FIG. 7, the spatial resolution S=4, and it is assumed that the events $\Delta\Phi$ occur at locations (i+4) and (i+6) of the sensing fiber.

Correspondingly, at a time of $t_{i+4}$, $I_{i+4}$ includes 8 cosine items of $\Delta\Phi$.

At a time of $t_{i+5}$, $I_{i+5}$ includes 12 cosine items of $\Delta\Phi$.
At a time of $t_{i+6}$, $I_{i+6}$ includes 12 cosine items of $\Delta\Phi$ and 4 cosine items of $2\Delta\Phi$.
At a time of $t_{i+7}$, $I_{i+7}$ includes 12 cosine items of $\Delta\Phi$ and 4 cosine items of $2\Delta\Phi$.
At a time of $t_{i+8}$, $I_{i+8}$ includes 12 cosine items of $\Delta\Phi$.
At a time of $t_{i+9}$, $I_{i+9}$ includes 8 cosine items of $\Delta\Phi$.

Further, $L_{max}$ is at (i+6). According to formula (20), it may be calculated that locations at which the events occur are (i+4) and (i+6).

Figure 8:
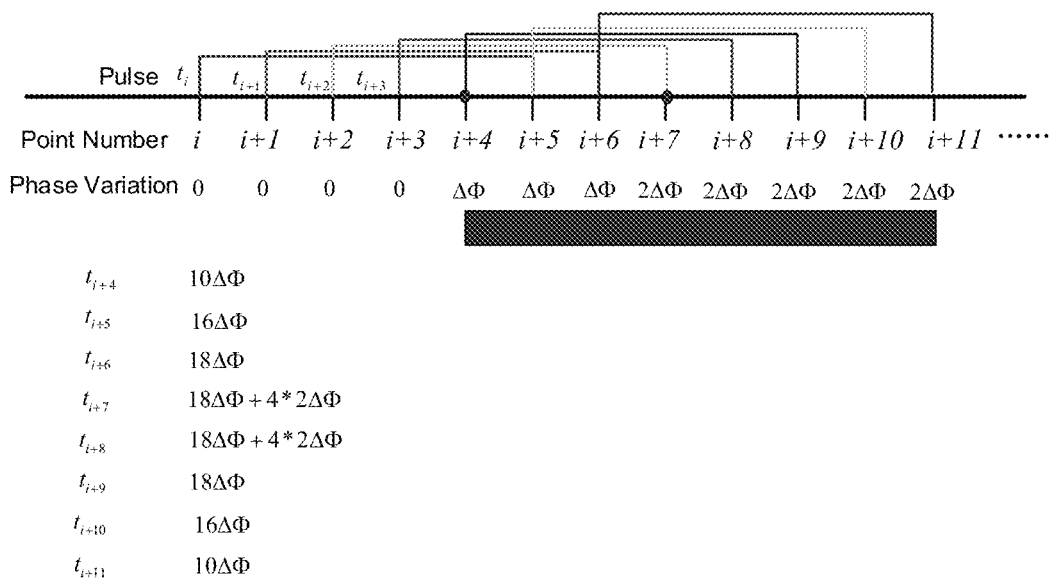
FIG. 8 is a diagram of phase demodulation results at different times when two events occur within a range of a spatial resolution and the spatial resolution is an odd number according to an embodiment of the present invention.

FIG. 8 is a diagram of phase demodulation results at different times when two events occur within a range of a spatial resolution and the spatial resolution is an odd number according to an embodiment of the present invention. As shown in FIG. 8, the spatial resolution S=5, and it is assumed that events $\Delta\Phi$ occur at locations (i+4) and (i+7) of the sensing fiber.

Correspondingly, at the time of $t_{i+4}$, $I_{i+4}$ includes 10 cosine items of $\Delta\Phi$.

At a time of $t_{i+5}$, $I_{i+5}$ includes 18 cosine items of $\Delta\Phi$.
At a time of $t_{i+6}$, $I_{i+6}$ includes 18 cosine items of $\Delta\Phi$.
At a time of $t_{i+7}$, $I_{i+7}$ includes 18 cosine items of $\Delta\Phi$ and 4 cosine items of $2\Delta\Phi$.
At a time of $t_{i+8}$, $I_{i+8}$ includes 18 cosine items of $\Delta\Phi$ and 4 cosine items of $2\Delta\Phi$.
At a time of $t_{i+9}$, $I_{i+9}$ includes 18 cosine items of $\Delta\Phi$.
At a time of $t_{i+10}$, $I_{i+10}$ includes 16 cosine items of $\Delta\Phi$.
At a time of $t_{i+11}$, $I_{i+11}$ includes 10 cosine items of $\Delta\Phi$.

Further, $L_{max}$ is at (i+7). According to formula (19), it may be calculated that locations at which the events occur are (i+4) and (i+7).

It should be noted that the foregoing derivations are calculated by using the times at which the front edge of the optical pulse arrives. If a back edge of the optical pulse is used, on the basis of the foregoing formulas, a propagation distance corresponding to a pulse width of the pulse light is added; this is illustrated as follows:

3) When an event occurs in the spatial resolution S, correspondingly, a correspondence relationship between the location at which the event occurs in the sensing fiber and the sensing location where the interference field signal has the maximum optical power is that:

a. When the spatial resolution S is an odd number, the location at which the event occurs in the sensing fiber is:

$$L_{th}=P_{max}-(S-1)/2+N \quad \text{Formula (21)}$$

The spatial resolution $$S = \frac{P \times 10^{-9} \times C}{2 \times n_f},$$

and P represents a pulse width of a light pulse signal.

b. When the spatial resolution S is an even number, the location at which the event occurs in the sensing fiber is:

$$L_{th}=P_{max}-S/2+1+N \quad \text{Formula (22)}$$

4) When two events occur in the spatial resolution S, correspondingly, a correspondence relationship between locations at which the events occur in the sensing fiber and the sensing location where the interference field signal has the maximum optical power are that:

a. When the spatial resolution is an odd number, the locations at which the events occur in the sensing fiber are respectively and $$L_{th1}=L_{max}-(S+1)/2+N \text{ and}$$

$$L_{th2}=L_{max}-(S+1)/2M-S+1+N \quad \text{Formula (23)}$$

b. When the spatial resolution is an even number, the locations at which the events occur in the sensing fiber are respectively and $$L_{th1}=L_{max}-(S+2+N \text{ and}$$

$$L_{th2}=L_{max}-S+M-S+1+N \quad \text{Formula (24)}$$

Figure 9:
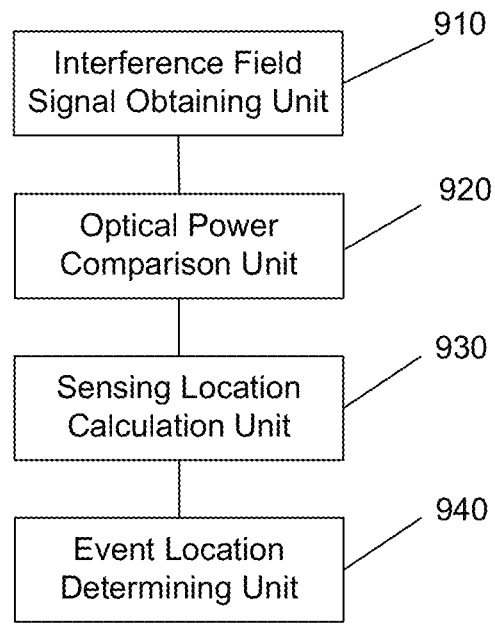
FIG. 9 is a basic schematic structural diagram of an event positioning device in a distributed fiber vibration monitoring system according to an embodiment of the present invention.

On the basis of an inventive concept same as that of the foregoing method, the present invention further provides a distributed fiber event positioning device that is applied to a distributed fiber vibration monitoring system based on Rayleigh scattering. FIG. 9 is a basic schematic structural diagram of an event positioning device in a distributed fiber vibration monitoring system according to an embodiment of the present invention. As shown in FIG. 9, the device includes:

an interference field signal obtaining unit 910, configured to obtain respective interference field signals corresponding to backward Rayleigh scattering lights that are generated when a pulse light is transmitted in a sensing fiber in the distributed fiber vibration monitoring system;

an optical power comparison unit 920, configured to compare optical powers of the respective interference field signals to obtain an interference field signal having a maximum optical power;

a sensing location calculation unit 930, configured to calculate a sensing location at which the interference field signal having the maximum optical power is generated, according to a time when the interference field signal having the maximum optical power is received and a time when the pulse light is injected into the sensing fiber; and an event location determining unit 940, configured to determine, according to the sensing location, a location at which an event occurs in the sensing fiber.

According to the distributed fiber event positioning method provided in the present embodiment, when the location at which the event occurs in the sensing fiber is to be positioned, the interference field signal having the maximum optical power is obtained by comparing the optical powers of the respective interference field signals corresponding to the backward Rayleigh scattering lights that are generated when the pulse light is transmitted in the sensing fiber. Subsequently, the sensing location of the interference field signal having the maximum optical power is calculated. Finally, the location at which the event occurs in the sensing fiber is determined according to the sensing location and a location distribution pattern of the event. According to the positioning method provided in the present invention, by means of screening the interference field signals and then calculating the event location, the spatial resolution is not determined merely by the pulse width of the optical signal. Therefore, the location positioning of the event can be more accurate, thereby improving an accuracy of the spatial resolution. The accuracy of the spatial resolution may be reduced from dozens of meters to several meters.

On the basis of the foregoing method and device, the present embodiment further provides a distributed fiber vibration monitoring system. The system includes the distributed fiber event positioning device described above, and further includes components such as a laser, an acousto-optic modulator, a circulator, a sensing fiber, and a photodetector and so on.

The embodiments in the present specification are described in a progressive manner. For the same or similar parts between the embodiments, reference may be made to each other. For each embodiment, emphasis is put on the difference between one embodiment and the other.

A person skilled in the art would easily conceive of other implementation solutions of the present invention after considering the specification and practicing the invention herein. The present invention is intended to cover any variations, uses, or adaptive changes of the present invention. These variations, uses, or adaptive changes follow the general principle of the present invention and include the common knowledge or conventional technical solutions in this technical filed of the present invention. The specification and the embodiments are merely considered as exemplary, and the actual scope and spirit of the present invention are indicated in the following claims.

It should be understood that the present invention is not limited to the exact structure that is described above and is shown in the figures, and various modifications and changes can be made thereto, without departing from the scope thereof. The scope of the present invention is merely limited by the appended claims.

What is claimed is:

1. An event positioning method in a distributed fiber vibration monitoring system, which is applied to the distributed fiber vibration monitoring system based on Rayleigh scattering, wherein the method comprises:
    obtaining respective interference field signals corresponding to backward Rayleigh scattering lights that are generated when a pulse light is transmitted in a sensing fiber in the distributed fiber vibration monitoring system;
    comparing optical powers of the respective interference field signals to obtain an interference field signal having a maximum optical power;
    calculating a sensing location at which the interference field signal having the maximum optical power is generated, according to a time when the interference field signal having the maximum optical power is received and a time when the pulse light is injected into the sensing fiber; and
    determining, according to the sensing location and a spatial resolution of the distributed fiber vibration monitoring system calculated according to a pulse width of the pulse light, a location at which an event occurs in the sensing fiber.

2. The method according to claim 1, wherein the determining, according to the sensing location, a location at which an event occurs in the sensing fiber comprises:
    obtaining a parity of the spatial resolution, wherein,
    when the spatial resolution is an odd number, the location at which the event occurs in the sensing fiber is $L_{th}=L_{max}-(S-1)/2$;
    when the spatial resolution is an even number, the location at which the event occurs in the sensing fiber is $L_{th}=L_{max}-S/2+1$; and
    where $L_{max}$ represents the sensing location, and S represents the spatial resolution.

3. The method according to claim 1, wherein the determining, according to the sensing location, a location at which an event occurs in the sensing fiber comprises:

when the spatial resolution is an odd number, the locations at which the events occur in the sensing fiber are $L_{th1}=L_{max}-(S+1)/2$ and $L_{th2}=L_{max}-(S+1)/2+M-S+1$, respectively;

when the spatial resolution is an even number, the locations at which the events occur in the sensing fiber are $L_{th1}=L_{max}-S/2$ and $L_{th2}=L_{max}-S/2+M-S+1$, respectively; and where $L_{max}$ represents an effective sensing location, $L_{th1}$ represents a first location point at which the event occurs, $L_{th2}$ represents a second location point at which the event occurs, S represents the spatial resolution, and M represents a quantity of interference field signals having disturbance information.

4. The method according to claim 1, wherein the determining, according to the sensing location, a location at which an event occurs in the sensing fiber comprises:

obtaining a parity of the spatial resolution, wherein, when the spatial resolution is an odd number, the location at which the event occurs in the sensing fiber is $L_{th}=P_{max}-(S-1)/2+N$;

when the spatial resolution is an even number, the location at which the event occurs in the sensing fiber is $L_{th}=P_{max}-S/2+1+N$; and where $L_{max}$ represents the sensing location, S represents the spatial resolution, N represents a propagation distance corresponding to the pulse width of the pulse light.

5. The method according to claim 1, wherein the determining, according to the sensing location, a location at which an event occurs in the sensing fiber comprises:

when the spatial resolution is an odd number, locations at which events occur in the sensing fiber are $L_{th1}=L_{max}-(S+1)/2+N$ and $L_{th2}=L_{max}-(S+1)/2+M-S+1+N$, respectively;

when the spatial resolution is an even number, the locations at which the events occur in the sensing fiber are $L_{th1}=L_{max}-S/2+N$ and $L_{th2}=L_{max}-S/2+M-S+1+N$, respectively; and where $L_{max}$ represents an effective sensing location, $L_{th1}$ represents the first location point at which the event occurs, $L_{th2}$ represents the second location point at which the event occurs, S represents the spatial resolution, M represents the quantity of the interference field signals having disturbance information, and N represents a propagation distance corresponding to the pulse width of the pulse light.

6. An event positioning device in a distributed fiber vibration monitoring system, which is applied to the distributed fiber vibration monitoring system based on Rayleigh scattering, wherein the device comprises:

an interference field signal obtaining unit, configured to obtain respective interference field signals corresponding to backward Rayleigh scattering lights that are generated when a pulse light is transmitted in a sensing fiber in the distributed fiber vibration monitoring system;

an optical power comparison unit, configured to compare optical powers of the respective interference field signals to obtain an interference field signal having a maximum optical power;

a sensing location calculation unit, configured to calculate a sensing location at which the interference field signal having the maximum optical power is generated, according to a time when the interference field signal having the maximum optical power is received and a time when the pulse light is injected into the sensing fiber; and an event location determining unit, configured to determine, according to the sensing location and a spatial resolution of the distributed fiber vibration monitoring system calculated according to a pulse width of the pulse light, a location at which an event occurs in the sensing fiber.

7. A distributed fiber vibration monitoring system comprising the event positioning device in the distributed fiber vibration monitoring system according to claim 6, and further comprising a laser, an acousto-optic modulator connected to the laser, a circulator connected to the acousto-optic modulator, a sensing fiber connected to the circulator, and a photodetector connected to the event positioning device in the distributed fiber vibration monitoring system and the circulator.

* * * * *